March 23, 1965 D. R. VON RECKLINGHAUSEN 3,175,040

BALANCED STEREOPHONIC DEMODULATOR APPARATUS

Filed May 9, 1962

INVENTOR.
DANIEL R. vonRECKLINGHAUSEN
BY Rines and Rines
ATTORNEYS

United States Patent Office 3,175,040

Patented Mar. 23, 1965

3,175,040
BALANCED STEREOPHONIC DEMODULATOR APPARATUS

Daniel R. von Recklinghausen, Arlington, Mass., assignor to H. H. Scott, Inc., Maynard, Mass., a corporation of Massachusetts Filed May 9, 1962, Ser. No. 193,533
9 Claims. (Cl. 179—15)

Figure 1:
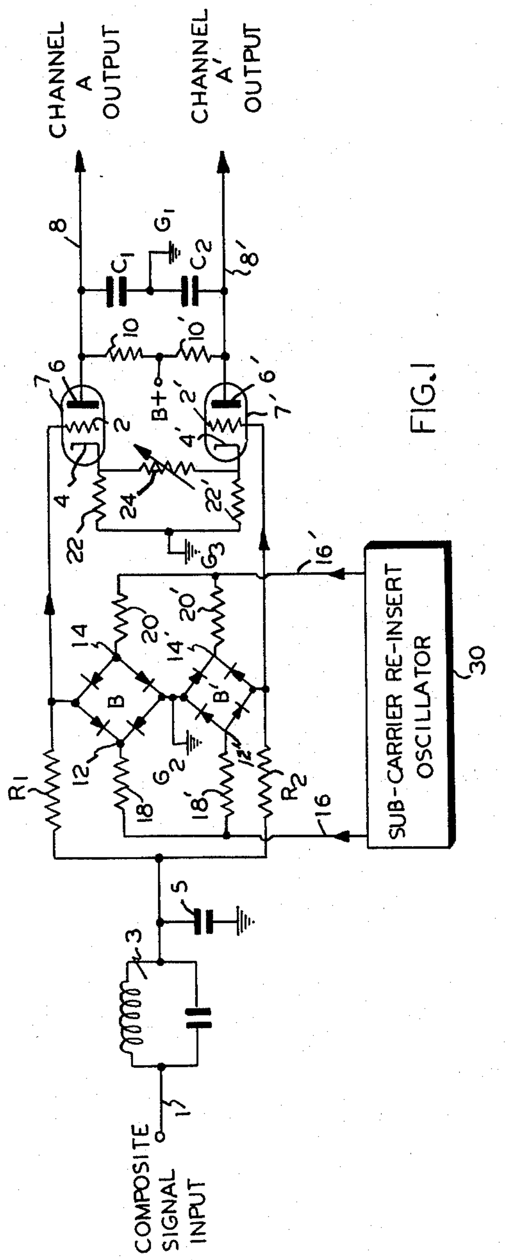

The present invention relates to demodulator apparatus and, more particularly, to balanced demodulators for detecting such signals as main and sub-channel composite signal components that are contained in frequency-modulated stereophonic broadcast transmissions.

In the broadcasting of frequency-modulation stereophonic signals, it is customary to transmit a main channel audio signal component as a frequency-modulated signal and simultaneously to transmit a double-sideband suppressed carrier having an amplitude-modulated sub-channel audio-signal component, as described, for example, in my article entitled, "Stereophonic FM-Receivers and Adapters," appearing on pages 66–71 of the Institute of Radio Engineers Transactions On Broadcast and Television Receivers, volume BTR-7, November 1961, No. 3. As therein explained, numerous proposals have been offered for demodulating the composite stereo-modulation signals in order to produce left and right signals for stereophonic reproduction purposes. Inherent difficulties with prior-art demodulators, however, reside in the fact that the demodulator circuits produce a less efficient demodulation for the sub-channel signal components than for the main signal component. This is because the sub-channel signal component is, in effect, a voltage sine-wave that, during the switching cycle of demodulation, inherently has less area than the substantially square areas of the same voltage peak-amplitude involved during the switching-demodulation of the steady-value main-channel signal component. In addition, prior-art demodulator circuits have been subject to the further disadvantage that components of the switching frequency employed in the demodulation process appear in the output. The switching frequency demodulation process serves to eliminate the sub-carrier frequency containing the sub-channel signal component, and such switching frequency is generated locally at the demodulator as a re-insert sub-carrier oscillation of the sub-carrier frequency. The undesirable switching frequency components appearing in the output of the demodulator can overload some amplifiers, loud-speakers, and other output loads and can cause beat tones in tape-recorders and the like connected to the output. Care must thus be taken to remove the same by subsequent filtering.

An object of the present invention, however, is to provide a new and improved stereophonic demodulator apparatus that, unlike the prior-art devices above referred to, compensates for the inherent relative inefficiency of the demodulation process with regard to the sub-channel signal components, and, in addition, eliminates the possibility of switching-frequency components appearing in the output of the demodulator with the consequent disadvantages of overload and beat-note production previously discussed.

A further object is to provide a novel balanced stereophonic demodulator apparatus of the character described.

Still an additional object is to provide a new and improved demodulator apparatus of more general utility, also.

In summary, from one of its broad points of view, the invention contemplates apparatus for demodulating a composite signal comprising a main-channel-signal frequency-modulated component and a suppressed-carrier-modulated sub-channel-signal component, said apparatus having, in combination, a pair of audio amplifiers each provided with input and output circuits and with means connected with each said input circuit for applying the said composite signals thereto. A pair of oppositely poled demodulator circuits, preferably of the rectifier bridge type, is provided, one connected in each said input circuit and each provided with a pair of terminals. To these pairs of terminals of the domdulator circuits are applied push-pull re-insert sub-carrier oscillations of frequency corresponding to that of the said suppressed carrier, in order to permit and prevent the passage of a composite signal during alternate portions of the period of the said oscillations, thereby to amplify the resulting demodulated sub-channel signal components in the pair of amplifiers in push-pull while amplifying the demodulated main-channel signal components in parallel. Preferred details are hereinafter set forth.

Figure 2:
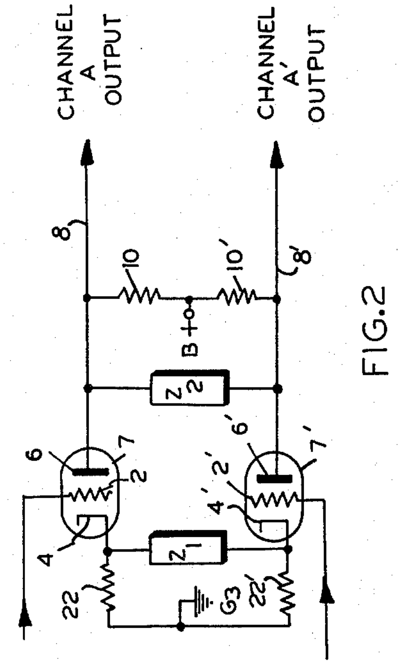

The invention will now be described in connection with the accompanying drawing, FIG. 1 of which is a schematic circuit diagram illustrating the invention in preferred form; and FIG. 2 is a partial schematic diagram of a modified output portion of the circuit of FIG. 1.

Referring to FIG. 1, a composite stereo-modulation signal or the like of the above-described character is shown applied at the input conductor 1 and fed to a low-pass filter 3, illustrated as of the M-derived L-C type with a trap including the shunt capacitor 5 to ground, for eliminating or modifying the composite signal to remove or eliminate noise components above the highest frequency of interest, including noise components resulting from the tuner detection process during the reception of the transmitted signal. The broadcasted signal, for example, is of the frequency-modulated type, having a carrier frequency of the order of 100 megacycles, a main-channel signal component in the audio range of from 50 cycles to 15 kilocycles frequency-modulated thereupon, and a sub-carrier of 38-kilocycles, amplitude-modulated with a second audio signal comprising the sub-channel signal component, with the sub-carrier suppressed. The main and sub-channel signals may comprise stereophonic signals and they will be received and detected in a conventional tuner, not shown, preceding the composite signal input conductor 1. The filter 3 may be a 54-kilocycle low-pass filter and the by-pass capacitor 5 may serve to trap frequencies at about 67 kilocycles.

The thusly modified composite signal is then applied to resistors $R_1$ and $R_2$, in parallel, and thence to the input control electrodes 2 and 2′ of a pair of audio amplifiers, illustrated, for purposes of explanation, as electron-tube relays 7 and 7′, though transistor and other types of amplifying relays may obviously also be employed. The amplifying relays 7 and 7′ are also shown provided with cathode electrodes 4 and 4′ and output anode electrodes 6 and 6′ which connect by means of output-circuit conductors 8 and 8′ to stereophonic channels A and A′. The anodes 6 and 6′ are connected through plate loads 10 and 10′ to the positive terminal B+ of the power source for the relays 7 and 7′, the negative terminal of which may be ground. The term "ground" as used herein is intended to embrace not only actual earthing, but also chassis or other reference potential as well. De-emphasis capacitors $C_1$ and $C_1$ are connected to a ground terminal $G_1$ from the respective output conductors 8 and 8′ of the respective stereo output channels A and A′.

In accordance with the invention, a pair of demodulator circuits, illustrated in the preferred form of four-element rectifier-diode bridges B and B′, is connected in the input circuits between respective resistors $R_1$ and $R_2$ and the corresponding input control electrodes 2 and 2′ of the respective amplifying relays 7 and 7′. While other configurations of rectifiers or other switching elements may be employed, the type of circuit illustrated in FIG. 1 is preferred because of its inherent balanced features. It will be observed that each of the rectifiers contained in the four arms of each of the bridges B and B′ is poled oppositely to the corresponding rectifier in the other bridge of the pair of demodulator circuits, and that push-pull operation is effected by applying switching-frequency oscillations to the opposite vertex terminals 12 and 14 of the bridge B, and the corresponding vertices 12′ and 14′ of the bridge B′. These push-pull oscillations are generated in an oscillator 30 that reinserts a sub-carrier, corresponding to the transmitted 38 kilocycle sub-carrier before discussed. Alternate portions of the period of the 38-kilocycle reinserted sub-carrier permit passage or prevent passage of the composite signal through the bridges B and B′ to the common ground terminal $G_2$ shared by the lower and upper respective vertex terminals of the respective bridges B and B′. The sub-carrier reinsert oscillator 30 provides such push-pull oscillations at 16 and 16′ for respective application to the left-hand vertex terminals 12 and 12′ of the respective bridges B and B′, and to the right-hand vertex terminals 14 and 14′ thereof, through similar resistances respectively numbered 18, 18′, 20, and 20′. These circuit connections of demodulator circuits B and B′ result in the application to the control electrodes 2 and 2′ of the respective amplifying relays 7 and 7′ of signals such that the amplifiers operate in parallel amplification with regard to the resulting demodulated main-channel signal component, while in push-pull amplification for the resulting demodulated sub-channel signal components. Since the re-insert carrier oscillator 30, moreover, applies its oscillations in push-pull, as before explained, only the existence of a residual circuit-component unbalance would permit the 38-kilocycle switching frequency or multiples thereof to appear in the audio output channels A and A′ of output conductors 8 and 8′; so that the undesirable effect of having the re-insert switching-frequency appear in the output, as in prior-art demodulator circuits, is avoided through proper balancing of the circuit of the present invention. This is because the re-insert switching oscillation is effectively applied in push-pull separately to the two amplifier inputs at 2 and 2′ and thus there is cancellation of the same for a balanced condition of operation.

Negative feedback is effected by cathode load resistors 22 and 22′, connected to the ground terminal $G_3$. A cross-over connection by means of the variable resistance element 24, connected between the cathodes 4 and 4′, will provide a reduced feedback and increased gain for the push-pull amplification of the sub-channel signal components, however, thereby compensating for the before-mentioned reduced efficiency of the demodulator circuit for the sub-channel signal components. The main-channel signal component will be amplified with greater negative feedback since both amplifiers are in phase and only the separate cathode resistors 22 and 22′ act as negative feedback elements for the parallel amplification of the main-channel signal.

For proper separation of the left and right stereophonic signals at the output 8 and 8′, the demodulated sub-channel signal component and main channel signal component must have substantially the same voltage relationship for all audio frequencies and must also suffer the same delay in passing through the system. This result is accomplished by eliminating possible interfering components above 53 kilocycles, as before discussed, in connection with the low-pass filter 3 and with the phase-linear trap formed by the elements 3, 5, before discussed. The sum of the upper and lower side bands of the sub-carrier frequency thus remains substantially constant and the same delay is produced as when the main-channel signal component passes through the filter.

A further advantage of the single or lower side-band demodulation operation above described resides in the considerable reduction of interference from background music, which may be multiplexed upon the frequency-modulation broadcast above the 53 kilocycles. The principal disadvantages of such operation reside in a slight decrease in signal-to-noise ratio and a necessity for post-detection equalization when simple filters are employed. The post-detection equalization may, however, be readily obtained. In FIG. 2, a passive reactive impedance element $Z_1$ is substituted for the cross-over resistor 24, and a further passive partially reactive impedance element $Z_2$ is connected between the output electrodes 6 and 6′ of the respective amplifier relays 7 and 7′. With the aid of these passive reactive elements $Z_1$ and $Z_2$ and their appropriate adjustments, such post-detection equalization is achieved.

Further modications will occur to those skilled in the art and all such are considered to fall within the spirit and scope of the invention as defined in the appended claims.

What is claimed is:

1. Apparatus for demodulating a composite signal comprising a main-channel-signal frequency modulated component and a suppressed-carrier-modulated sub-channel signal component, said apparatus having, in combination, a pair of audio amplifiers each provided with input and output circuits, each of said input circuits having a pair of input terminals, a pair of oppositely poled bridge rectifier demodulator circuits, each provided with first and second pairs of terminals, means connected to the first pair of terminals of each of said demodulator circuits for applying the said composite signal thereto, means connecting the first pair of terminals of one of said demodulator circuits to corresponding input terminals of one of said amplifiers, means connecting the first pair of terminals of the other of said demodulator circuits to corresponding input terminals of the other of said amplifiers, and means connected with the second pairs of terminals of the pair of demodulator circuits for applying thereto push-pull reinsert sub-carrier oscillations of frequency corresponding to that of the said suppressed carrier in order to permit and prevent the passage of signal during alternate portions of the period of the said oscillations.

2. Apparatus as claimed in claim 1 and in which the said main and sub-channel signal components are stereophonic signals.

3. Apparatus as claimed in claim 1 and in which the first-named composite-signal-applying means includes a filter for modifying the said composite signal to remove high-frequency noise components.

4. Apparatus as claimed in claim 1 and in which each rectifier bridge is provided with four rectifying arms connected in sequence between successive terminals of the bridge, the first pair of terminals of each bridge constituting a pair of oppositely disposed vertices, one of which is connected to ground, and the second pair of terminals of each bridge constituting another pair of oppositely disposed vertices of the bridge.

5. Apparatus for demodulating a composite signal comprising a main-channel-signal frequency modulated component and a suppressed-carrier-modulated sub-channel signal component, said apparatus having, in combination, a pair of audio amplifiers each provided with input and output circuits, means connected with each said input circuit for applying the said composite signal thereto, a pair of oppositely poled demodulator circuits, one connected in each said input circuit and each provided with a pair of terminals, means connected with the pairs of terminals of the pair of demodulator circuits for applying thereto push-pull reinsert sub-carrier oscillations of frequency corresponding to that of the said suppressed carrier in order to permit and prevent the passage of signal during alternate portions of the period of the said oscillations, each of the pair of amplifiers being provided with a negative-feedback circuit, and means for adjusting the negative-feedback circuits to apply less negative feedback for the sub-channel signal components than for the main-channel signal components.

6. Apparatus as claimed in claim 5 and in which the pair of amplifiers are electron tubes having cathode, grid and anode electrodes with the grid electrodes connected to the first-named composite-signal-applying means, the anode electrodes connected to the said output circuits, and the cathode electrodes connected through cathode loads to ground with an impedance element interconnecting the cathodes.

7. Apparatus as claimed in claim 6 and in which the said impedance element is resistive.

8. Apparatus as claimed in claim 6 and in which the said impedance element is a reactive element.

9. Apparatus as claimed in claim 6 and in which the said output circuits are interconnected by a reactive impedance for enabling post-detection equalization.

References Cited in the file of this patent

UNITED STATES PATENTS

| | | |
|---|---|---|
| 2,851,617 | Walker | Sept. 9, 1958 |
| 3,040,132 | Wilhelm | June 19, 1962 |
| 3,043,914 | Collins | July 10, 1962 |
| 3,070,662 | Eilers | Dec. 25, 1962 |

OTHER REFERENCES

Electronics World, January 1962, article by Crowhurst, "FM Multiplex Stereo Detection Methods," pages 50–52 and 80 relied on.

Radio-Electronics, June 1962, article by Crowhurst, "More Circuits For FM Stereo," pages 53–55.